US008325991B2

(12) United States Patent
Iizuka

(10) Patent No.: US 8,325,991 B2
(45) Date of Patent: Dec. 4, 2012

(54) DEVICE AND METHOD FOR BIOMETRICS AUTHENTICATION

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 12/445,898

(22) PCT Filed: Oct. 16, 2007

(86) PCT No.: PCT/JP2007/070510
§ 371 (c)(1),
(2), (4) Date: Apr. 16, 2009

(87) PCT Pub. No.: WO2008/047934
PCT Pub. Date: Apr. 24, 2008

(65) Prior Publication Data
US 2010/0040265 A1 Feb. 18, 2010

(30) Foreign Application Priority Data
Oct. 17, 2006 (JP) ................. 2006-282743

(51) Int. Cl.
G06K 9/62 (2006.01)
(52) U.S. Cl. ........................ 382/115; 382/281
(58) Field of Classification Search .................. None
See application file for complete search history.

(56) References Cited

U.S. PATENT DOCUMENTS 5,832,138 A * 11/1998 Nakanishi et al. ............ 382/281
2005/0111738 A1* 5/2005 Iizuka ........................... 382/190

FOREIGN PATENT DOCUMENTS

| JP | 2002-279426 | 9/2002 |
|---|---|---|
| JP | 2003-85539 | 3/2003 |
| JP | 2004-171577 | 6/2004 |
| JP | 2005-115615 | 4/2005 |
| JP | 2005-215883 | 8/2005 |
| JP | 2006-195696 | 7/2006 |
| JP | 2007-233574 | 9/2007 |

OTHER PUBLICATIONS

Biometric Authentications for a financial transaction (http://www.fsa.go.jp/singi/singi_fccsg/gaiyou/f-20050415-singi_fccsg/02.pdf) (2005).
International Search Report from the Japanese Patent Office, dated Nov. 9, 2007, 2 pages.

* cited by examiner

Primary Examiner — Brian P Werner
(74) Attorney, Agent, or Firm — Finnegan, Henderson, Farabow, Garrett & Dunner, L.L.P.

(57) ABSTRACT

A registration device, verification device, authentication method and authentication program that can improve the accuracy of authentication are proposed. A predetermined process is performed for an image signal obtained as a result of taking a picture of a image-capturing target which is given as an object for biometrics authentication and which is a predetermined part of a living body; a characteristic part of the image-capturing target is extracted from the image signal; the Hough transform is carried out by characteristic extraction means for the extracted characteristic part; a plurality of characteristic parameter points are extracted from a parameter point obtained as a result of the Hough transform under a predetermined extraction condition; and a determination is made as to whether the plurality of characteristic parameter points are those to be registered or to be compared with the registered one according to an angle component of the plurality of the characteristic parameter points.

10 Claims, 12 Drawing Sheets (A) FINGER (B) PSEUDO FINGER (RADISH)

(A) FINGER (B) PSEUDO FINGER (RADISH)

(A) FINGER (B) PSEUDO FINGER (RADISH)

(A) FINGER (B) PSEUDO FINGER (RADISH)

DEVICE AND METHOD FOR BIOMETRICS AUTHENTICATION

CROSS REFERENCE TO RELATED APPLICATIONS

This application is a national phase application based on PCT/JP2007/070510, filed Oct. 16, 2007, which claims the priority of Japanese Patent Application No. 2006-282743, filed Oct. 17, 2006.

TECHNICAL FIELD

The present invention relates to a registration device, verification device, authentication method and authentication program, and is preferably applied for biometrics authentication.

BACKGROUND ART

A blood vessel has been among the subjects of biometrics authentication. An authentication device that uses the blood vessel as a target of biometrics authentication is proposed: the authentication device performs a predetermined process for an image data acquired as a result of taking a picture of a finger, binarizes the image data, and performs the Hough transform (For example, Patent Document 1).

Focusing on the fact that many of the blood vessels on the image are substantially linear, the authentication device adopted the Hough transform, which can extract the blood vessel from the image according to the length of the line or the blood vessel, thereby improving the accuracy of authentication.

Patent Document 1: Japanese Patent Publication No. 2005-115615

However, if root crops, such as radish, are used instead of the finger, the authentication device might wrongly recognize tubes inside the root crops as a target of biometrics authentication (these tubes, such as vessels, sieve tubes, fascicles, are referred to as an inside-root tubes, hereinafter) because they resemble the blood vessels of a living body; then, the acquired inappropriate parameters could be processed as registration data or data to be compared with the registration data. This fact was reported in: Tsutomu Matsumoto, "Biometrics Authentication for Financial Transaction," [online], Apr. 15, 2005, the 9th study group of the Financial Services Agency for the issues on forged cash cards, (searched Aug. 21, 2006. Accordingly, the problem is that if an image-capturing object (such as root crops, gummi candy, a print of a blood-vessel image, a dummy of a human finger) having a blood vessel-like pattern of a living body is applied as a pseudo finger, the authentication device may mistakenly recognize it.

DISCLOSURE OF THE INVENTION

The present invention has been made in view of the above points and is intended to provide a registration device, verification device, authentication method and authentication program that can improve the accuracy of authentication.

To solve the above problem, a registration device includes: outline extraction means for performing a predetermined process for an input image signal and extracting an outline of an object included in the image signal; Hough transform means for performing the Hough transform for a image data obtained as a result of extracting the outline; and registration means for registering the result of the Hough transform as living body identification information if an angle component that is part of a parameter obtained as a result of the Hough transform by the Hough transform means and that represents an angle of the outline with respect to a reference direction is within an angle range defined as a living body's part having linearity.

In this manner, the registration device makes a determination as to whether the result of the Hough transform should be registered as the living body identification information according to whether the angle component of the parameter obtained as a result of the Hough transform is within the predetermined angle range. Accordingly, if an image signal of a pseudo finger, such as a root crop whose inside-root tubes are widespread with a larger angle with respect to the direction of the circulation of blood compared with the finger's blood vessels, is input, the registration device can prevent itself from registering the result of the Hough transform for that image signal as the living body identification information. On the other hand, if an image signal of a finger, which is part of a living body, is input, the registration device registers the result of the Hough transform for that image signal as the living body identification information. Thus, the registration device can improve the accuracy of authentication.

Moreover, according to the present invention, a verification device includes: outline extraction means for performing a predetermined process for an input image signal and extracting an outline of an object included in the image signal; Hough transform means for performing the Hough transform for a image data obtained as a result of extracting the outline; and verification means for comparing the result of the Hough transform with previously-registered living body identification information if an angle component that is part of a parameter obtained as a result of the Hough transform by the Hough transform means and that represents an angle of the outline with respect to a reference direction is within an angle range defined as a living body's part having linearity.

In this manner, the verification device makes a determination as to whether the result of the Hough transform should be compared with the previously-registered living body identification information according to whether the angle component of the parameter obtained as a result of the Hough transform is within the predetermined angle range. Accordingly, if an image signal of a pseudo finger, such as a root crop whose inside-root tubes are widespread with a larger angle with respect to the direction of the circulation of blood compared with the finger's blood vessels, is input, the verification device can prevent itself from comparing the result of the Hough transform for that image signal with the previously-registered living body identification information. On the other hand, if an image signal of a finger, which is part of a living body, is input, the verification device compares the result of the Hough transform for that image signal with the previously-registered living body identification information. Thus, the verification device can improve the accuracy of authentication.

Moreover, according to the present invention, an authentication method includes: a first step of performing a predetermined process for an input image signal and extracting an outline of an object included in the image signal; a second step of performing the Hough transform for a image data obtained as a result of extracting the outline; and a third step of registering the result of the Hough transform as living body identification information or comparing the result of the Hough transform with the previously-registered living body identification information if an angle component that is part of a parameter obtained as a result of the Hough transform by the Hough transform means and that represents an angle of the outline with respect to a reference direction is within an angle range defined as a living body's part having linearity.

In this manner, the authentication method makes a determination as to whether the result of the Hough transform should be registered as the living body identification information or compared with the previously-registered living body identification information according to whether the angle component of the parameter obtained as a result of the Hough transform is within the predetermined angle range. Accordingly, if an image signal of a pseudo finger, such as a root crop whose inside-root tubes are widespread with a larger angle with respect to the direction of the circulation of blood compared with the finger's blood vessels, is input, the authentication method can prevent itself from registering the result of the Hough transform for that image signal as the living body identification information or comparing the result of the Hough transform for that image signal with the previously-registered living body identification information. On the other hand, if an image signal of a finger, which is part of a living body, is input, the authentication method registers the result of the Hough transform for that image signal as the living body identification information or compares the result of the Hough transform for that image signal with the previously-registered living body identification information. Thus, the authentication method can improve the accuracy of authentication.

Moreover, according to the present invention, an authentication program causing a computer to execute steps of: performing a predetermined process for an input image signal and extracting an outline of an object included in the image signal; performing the Hough transform for a image data obtained as a result of extracting the outline; and registering the result of the Hough transform as living body identification information or comparing the result of the Hough transform with the previously-registered living body identification information if an angle component that is part of a parameter obtained as a result of the Hough transform by the Hough transform means and that represents an angle of the outline with respect to a reference direction is within an angle range defined as a living body's part having linearity.

In this manner, the authentication program makes a determination as to whether the result of the Hough transform should be registered as the living body identification information or compared with the previously-registered living body identification information according to whether the angle component of the parameter obtained as a result of the Hough transform is within the predetermined angle range. Accordingly, if an image signal of a pseudo finger, such as a root crop whose inside-root tubes are widespread with a larger angle with respect to the direction of the circulation of blood compared with the finger's blood vessels, is input, the authentication program can prevent itself from registering the result of the Hough transform for that image signal as the living body identification information or comparing the result of the Hough transform for that image signal with the previously-registered living body identification information. On the other hand, if an image signal of a finger, which is part of a living body, is input, the authentication program registers the result of the Hough transform for that image signal as the living body identification information or compares the result of the Hough transform for that image signal with the previously-registered living body identification information. Thus, the authentication program can improve the accuracy of authentication.

As described above, according to the present invention, a determination is made as to whether a plurality of characteristic parameter points are those to be registered according to the angle components of the characteristic parameter points when the plurality of characteristic parameter points are extracted. Thus, the registration device, verification device, authentication method and authentication program that can improve the accuracy of authentication can be realized.

BEST MODE FOR CARRYING OUT THE INVENTION

Figure 1:
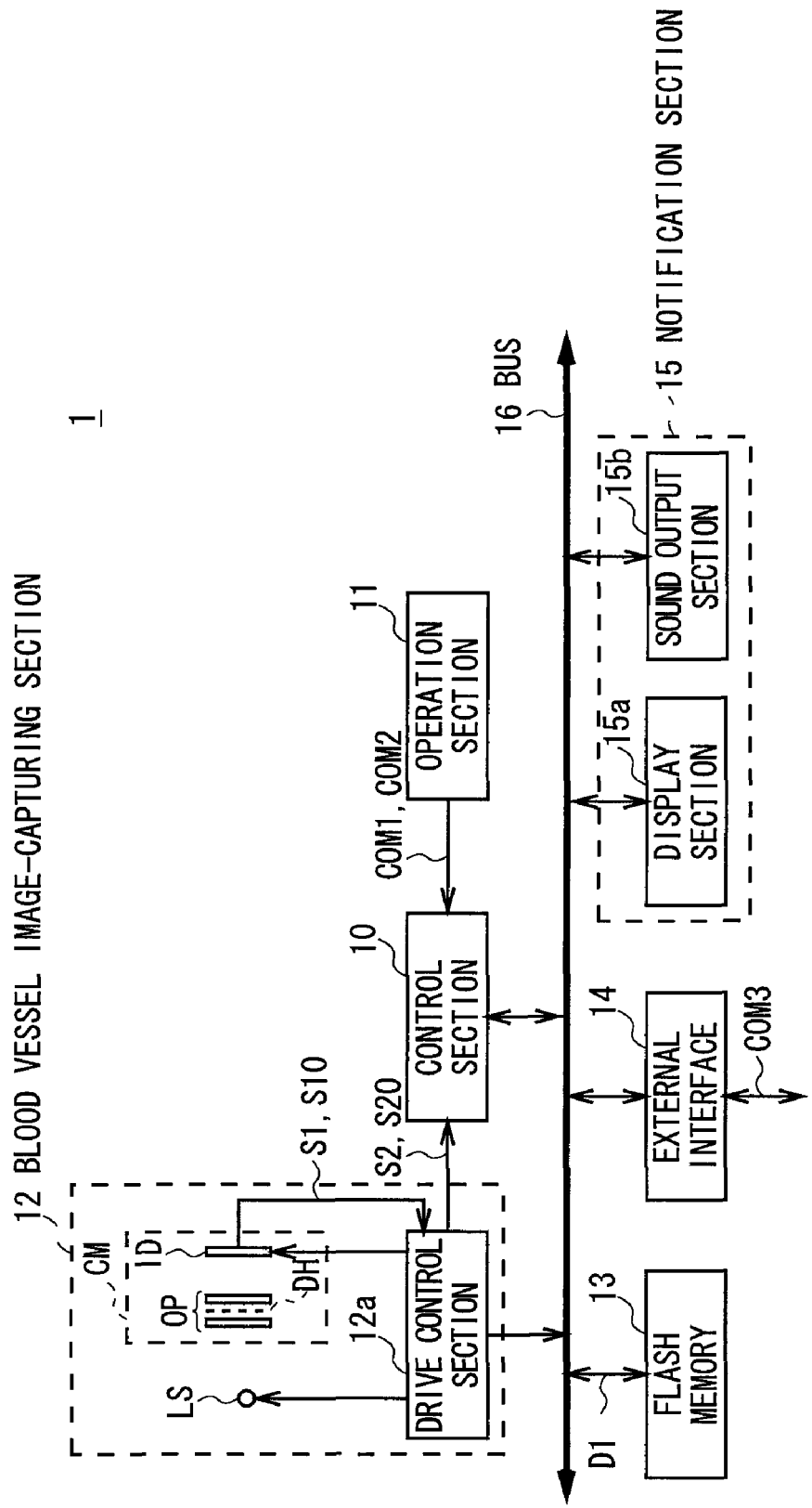
FIG. 1 is a block diagram illustrating the overall configuration of an authentication device according to a first embodiment of the present invention.

An embodiment of the present invention will be described in detail with reference to the accompanying drawings.
(1) First Embodiment
(1-1) The Overall Configuration of an Authentication Device According to a First Embodiment FIG. 1 shows the overall configuration of an authentication device 1 according to a first embodiment of the present invention. The authentication device 1 includes a control section 10: the control section 10 is connected to an operation section 11, a blood vessel image-capturing section 12, a flash memory 13, an interface 14 for exchanging data with an external section (referred to as an external interface, and hereinafter), and a notification section 15 through a bus 16.

The control section 10 is a microcomputer including CPU (Central Processing Unit) that takes overall control of the authentication device 1, ROM (Read Only Memory) that stores various-programs and setting information, and RAM (Random Access Memory) that serves as a work memory for CPU.

When a user operates the operation section 11, the operation section 11 gives an execution command COM1 or COM2 to the control section 10: the execution command COM1 is to start a mode of registering the blood vessels of a registration-target user (this mode is referred to as a blood vessel registration mode while this user is referred to as a registrant, hereinafter); the execution command COM2 is to start a mode of making a determination as to whether a person is the registrant (this mode is referred to as an authentication mode, hereinafter).

Based on these execution commands COM1 and COM2, the control section 10 decides which mode it will start, and then controls, when necessary, the blood vessel image-capturing section 12, the flash memory 13, the external interface 14 and the notification section 15 according to a program corresponding to the decided mode, thereby performing the blood vessel registration mode or the authentication mode.

(1-2) The Blood Vessel Registration Mode

Specifically, if it decides that the blood vessel registration mode is a mode to be executed, the control section 10 enters the blood vessel registration mode and controls the blood vessel image-capturing section 12.

In this case, a drive control section 12a of the blood-vessel image-capturing section 12 controls a near-infrared beam source LS that emits a near-infrared beam to a finger put at a predetermined position on the authentication device 1, and an image-capturing element ID of an image-capturing camera CM, such as CCD (Charge Coupled Device): there may be one or more near-infrared beam sources LS.

As a result, in the blood vessel image-capturing section 12, the near-infrared beam emitted to the finger gets into the finger, is reflected and dispersed inside the finger, emerges from the finger as a beam representing the blood vessels of the finger (this beam is referred to as a blood vessel representation beam), and enters the image-capturing element ID after passing through an optical system OP and an aperture diaphragm DH. The image-capturing element ID converts the blood vessel representation beam into electrical signals, and outputs them to the drive control section 12a as image signals S1.

Incidentally, part of the near-infrared beam emitted to the finger is actually reflected by the finger's surface, and then enters the image-capturing element ID. Accordingly, an image of the image signals S1 output from the image-capturing element ID contains not only the blood vessels inside the finger but also its outline and fingerprint.

Based on the pixel values of this image, the drive control section 12a adjusts the position of an optical lens of the optical system OP so that the blood vessels inside the finger are in focus. At the same time, the drive control section 12a adjusts an aperture value of the aperture diaphragm DH so that the amount of the beam entering the image-capturing element ID becomes appropriate. After the adjustment, the drive control section 12a supplies an image signal S2 output from the image-capturing element ID to the control section 10.

The control section 10 performs a predetermined image process for the image signals S2 to extract a characteristic of the blood vessels on the image, and stores the extracted blood-vessel characteristic in the flash memory 13 as information D1 that is used to identify the registrant (this information is also referred to as registrant identification data), thus registering the characteristic.

In that manner, the control section 10 performs the blood vessel registration mode.

(1-3) The Authentication Mode

On the other hand, if it is decided that the authentication mode is a mode to be executed, the control section 10 enters the authentication mode and controls the blood vessel image-capturing section 12 in a similar way to when performing the above-noted blood vessel registration mode.

In this case, the blood vessel image-capturing section 12 drives and controls the near-infrared beam source LS and the image-capturing element ID. At the same time, based on an image signal S10 output from the image-capturing element ID, the blood vessel image-capturing section 12 adjusts the position of the optical lens of the optical system OP and the aperture value of the aperture diaphragm DH. After the adjustment, the blood vessel image-capturing section 12 supplies an image signal S20 output from the image-capturing element ID to the control section 10.

The control section 10 performs the same image process for the image signals S20 as it performs during the above-noted blood vessel registration mode, and reads out the registrant identification data D1 from the flash memory 13. Then, the control section 10 performs a verification process in which a blood-vessel characteristic extracted by this image process is compared with the blood-vessel characteristic of the registrant identification data D1 read out from the flash memory 13. According to the degree of the comparison, the control section 10 makes a determination as to whether a user who put his finger is the registrant (an authorized user).

Here, if it determines that the user who put his finger is the registrant, the control section 10 generates an execution command COM3 in order to let an operation processing device (not shown), which is connected to the external interface 14, perform a predetermined operation. The control section 10 supplies this execution command COM3 to the operation processing device via the external interface 14.

The following describes the application of the operation processing device connected to the external interface 14: if a locked door is applied, the execution command COM3 transmitted from the control section 10 is to unlock the door; if a computer, which has a plurality of operation modes and whose current mode is limiting the use of some operation modes, is applied, the execution command COM3 transmitted from the control section 10 is to lift the limitation.

Incidentally, these two examples were described as the application. But there may be other applications. Moreover, in the first embodiment, the operation processing device is connected to the external interface 14. But instead of this, the authentication device 1 may contain a configuration of the software or hardware of the operation processing device.

Whereas, if it determines that he is not the registrant, the control section 10 displays on a display section 15a of the notification section 15 information to that effect, and outputs sound through a sound output section 15b of the notification section 15, visually and auditorily notifying a user of the fact that he is not the registrant.

In that manner, the control section 10 performs the authentication mode.

(1-4) The Detailed Description of the Image Process

Figure 2:
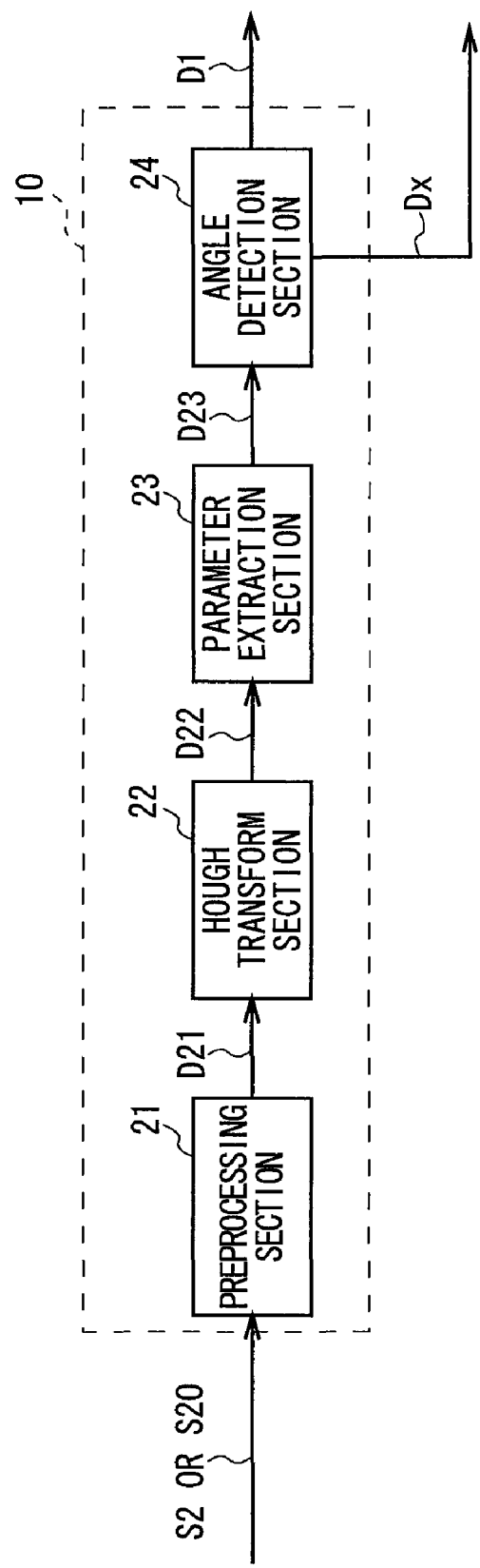
FIG. 2 is a functional block diagram illustrating the content of an image process by a control section according to a first embodiment of the present invention.

The following describes the image process by the control section 10. In terms of function, as shown in FIG. 2, the image process can be divided into sections: a preprocessing section 21, a Hough transform section 22, a parameter extraction section 23 and an angle detection section 24. These preprocessing section 21, Hough transform section 22, parameter extraction section 23 and angle detection section 24 will be described in detail below.

As for the image signals S2 or S20 supplied from the blood vessel image-capturing section 12, the preprocessing section 21 performs an A/D (Analog/Digital) conversion process, a predetermined outline extraction process such as Sobel filtering, a predetermined smoothing process such as Gaussian filtering, a binarization process, and a thinning process in that order, in order to extract an outline as a characteristic of an object included in the image signals S2 or S20. The preprocessing section 21 supplies resultant image data D21 to the Hough transform section 22.

Figure 3:
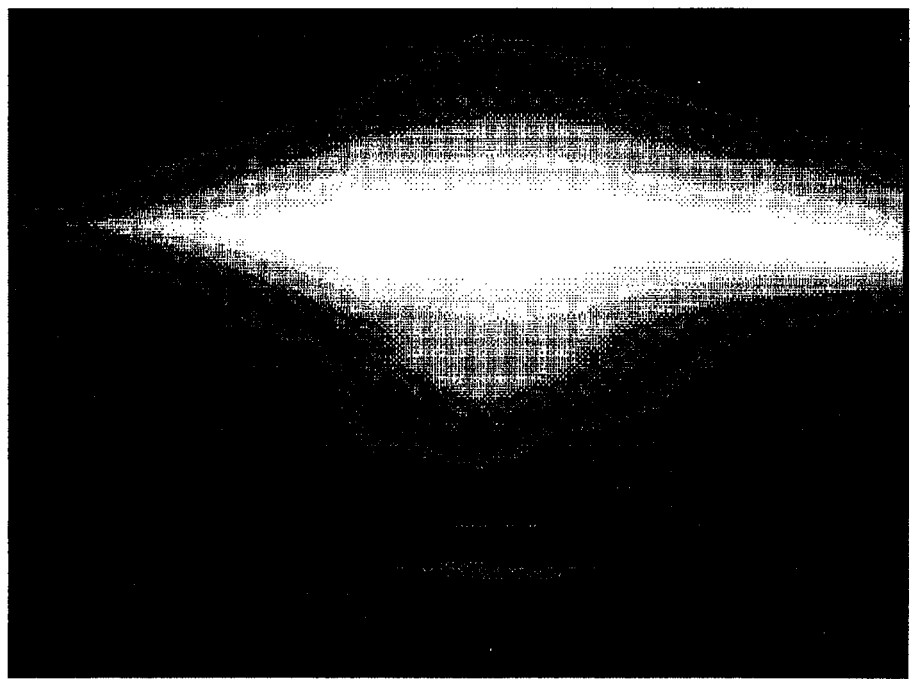
FIG. 3 is a schematic diagram illustrating a captured image.
Figure 3:
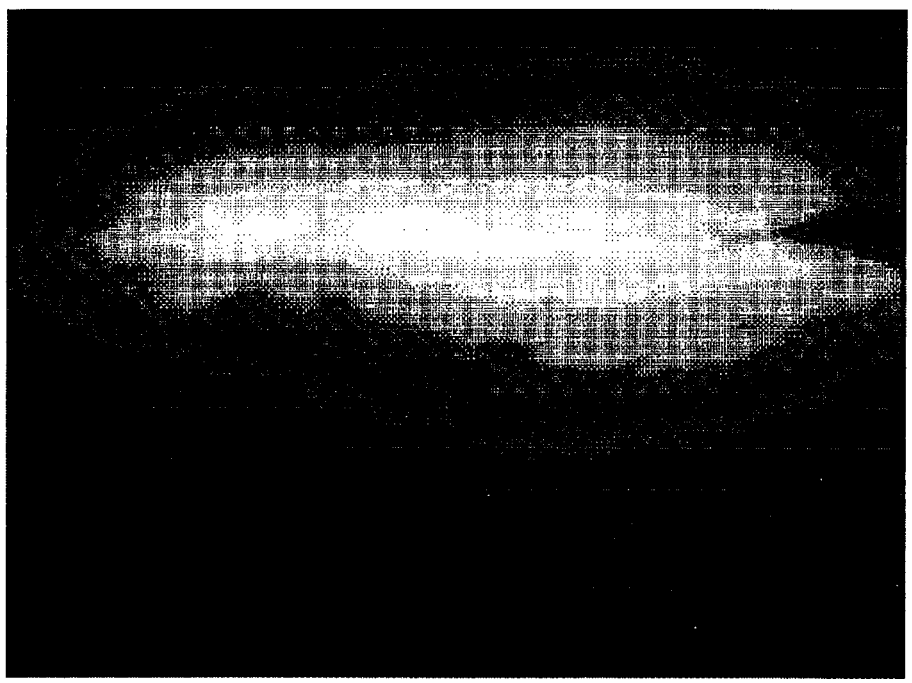
Figure 4:
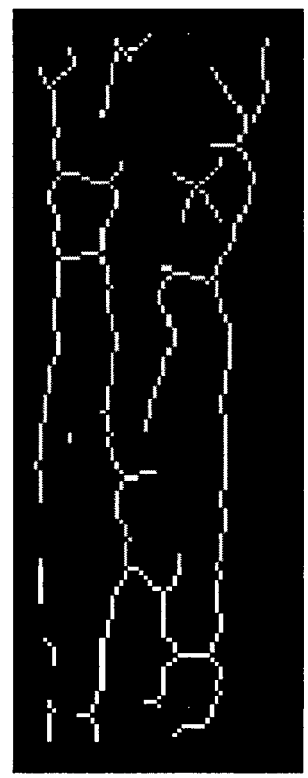
FIG. 4 is a schematic diagram illustrating an input image.
Figure 4:
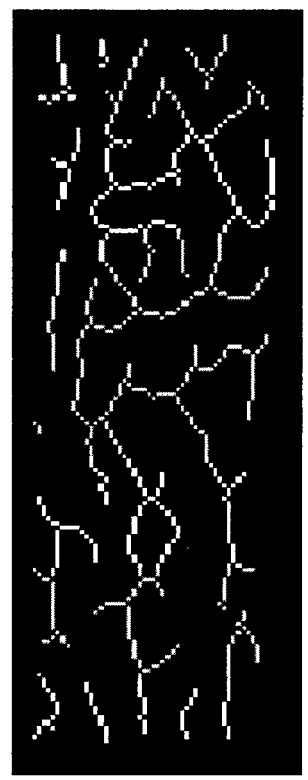

Incidentally, if the image signals S2 or S20 supplied from the blood vessel image-capturing section 12 represent, as shown in FIG. 3(A), an image generated as a result of taking a picture of a "finger" as a part of a living body, the image data D21 transmitted from the preprocessing section 21 to the Hough transform section 22 represent an outline of the finger's blood vessels as shown in FIG. 4(A). On the other hand, if the image signals S2 or S20 supplied from the blood vessel image-capturing section 12 represent, as shown in FIG. 3(B), an image that was generated as a result of taking a picture of a "root crop (radish)" or the like, which is a pseudo finger and is not a part of a living body, the image data D21 transmitted from the preprocessing section 21 to the Hough transform section 22 represent an outline of the radish's inside-root tubes as shown in FIG. 4(B).

The Hough transform section 22 performs the Hough transform for the image data D21. The following briefly describes the Hough transform.

Figure 5:
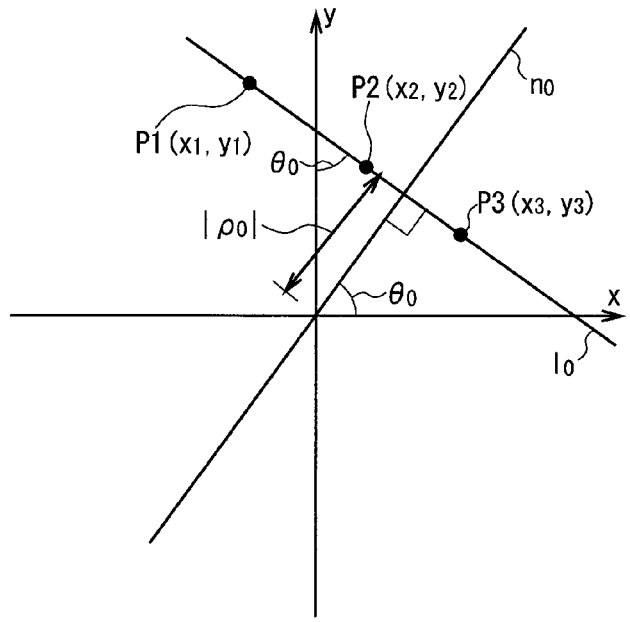
FIG. 5 is a schematic diagram illustrating how a line is represented on an x-y plane.

As shown in FIG. 5, there is a line $l_0$ on the x-y plane; a line perpendicular to the line $l_0$ and passing through the origin, or the position of a reference point, is $n_0$. An angle between the x axis, which is a reference direction, and the perpendicular line n0 is $\theta_0$ ($\theta_0$ also represents an angle between the y axis, which is, in this case, a reference direction, and the line $l_0$). A distance between the origin and a point where the line $l_0$ and the perpendicular line $n_0$ cross is $|\rho_0|$. In this case, the line $l_0$ can be represented by "$(\rho_0, \theta_0)$."

Here, the Hough transform for the x-y plane is defined as follows.

$$\rho = x \cos \theta + y \sin \theta \qquad (1)$$

Figure 6:
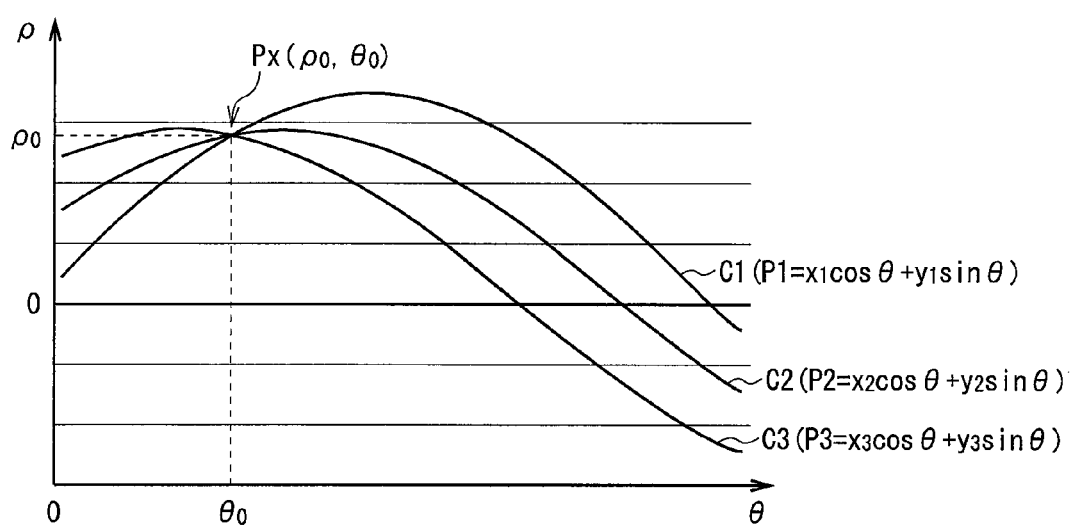
FIG. 6 is a schematic diagram illustrating how points are represented on a $\rho$-$\theta$ plane.

According to this Hough transform, a point $P1(x_1, y_1)$, a point $P2(x_2, y_2)$, and a point $P3(X_3, y_3)$ on the line $l_0$ of the x-y plane shown in FIG. 5 are represented as a curve $C1(x_1 \cos \theta + y_1 \sin \theta)$, a curve $C2(x_2 \cos \theta + y_2 \sin \theta)$, and a curve $C3(x_3 \cos \theta + y_3 \sin \theta)$, respectively, on an imaginary $\rho$-$\theta$ plane consisting of distance and angle components, as shown in FIG. 6.

On this $\rho$-$\theta$ plane, a point where the curves C1, C2 and C3 cross is $Px(\rho_0, \theta_0)$; this point $Px(\rho_0, \theta_0)$ is equivalent to the line $l_0$, which is a line on the x-y plane before the Hough transform. This means that the Hough transform converts the line $l_0$ on the x-y plane into points on the $\rho$-$\theta$ plane on each distance $|\rho_0|$ and angle $\theta$ basis.

Moreover, the more points (P1, P2, P3, . . . , Pn, . . . ) the line $l_0$ has on the x-y plane, the more curves (C1, C2, C3, . . . , Cn, . . . ) the Hough transform generates on the $\rho$-$\theta$ plane. As a result, the number of curves crossing at the point Px (FIG. 6) increases. Accordingly, the longer the line $l_0$ on the x-y plane, the greater the number of points on the line and hence, an increase in the number of curves (C1, C2, C3, . . . , Cn, . . . ) crossing the point corresponding to the line $l_0$ on the $\rho$-$\theta$ plane.

That means the points on the $\rho$-$\theta$ plane, which are the ones generated by the Hough transform, are quantitated according to the length of the line $l_0$ on the x-y plane before the Hough transform.

Incidentally, the length of the line $l_0$ on the x-y plane does not necessarily mean the length as its segment, but it does mean the total length of a series of points on one line. Accordingly, if the line is a dotted line or consists of a plurality of segments with spaces between them, the length of the line $l_0$ is its total length.

In that manner, according to the Hough transform, the line $l_0$ on the x-y plane is converted into the points (referred to as parameter points, hereinafter) on the $\rho$-$\theta$ plane. These points are represented by three parameters: distance, angle and length. By changing the extraction condition, the Hough transform can detect a linear component, which is greater than or equal to a predetermined length on the x-y plane before the Hough transform.

Moreover, since the line $l_0$ on the x-y plane is converted into the parameter points on the $\rho$-$\theta$ plane on each distance $|\rho_0|$ and angle $\theta$ basis according to the Hough transform, the distance between the linear component, which is a line on the x-y plane before the Hough transform, and the origin and its angle can be detected.

Figure 7:
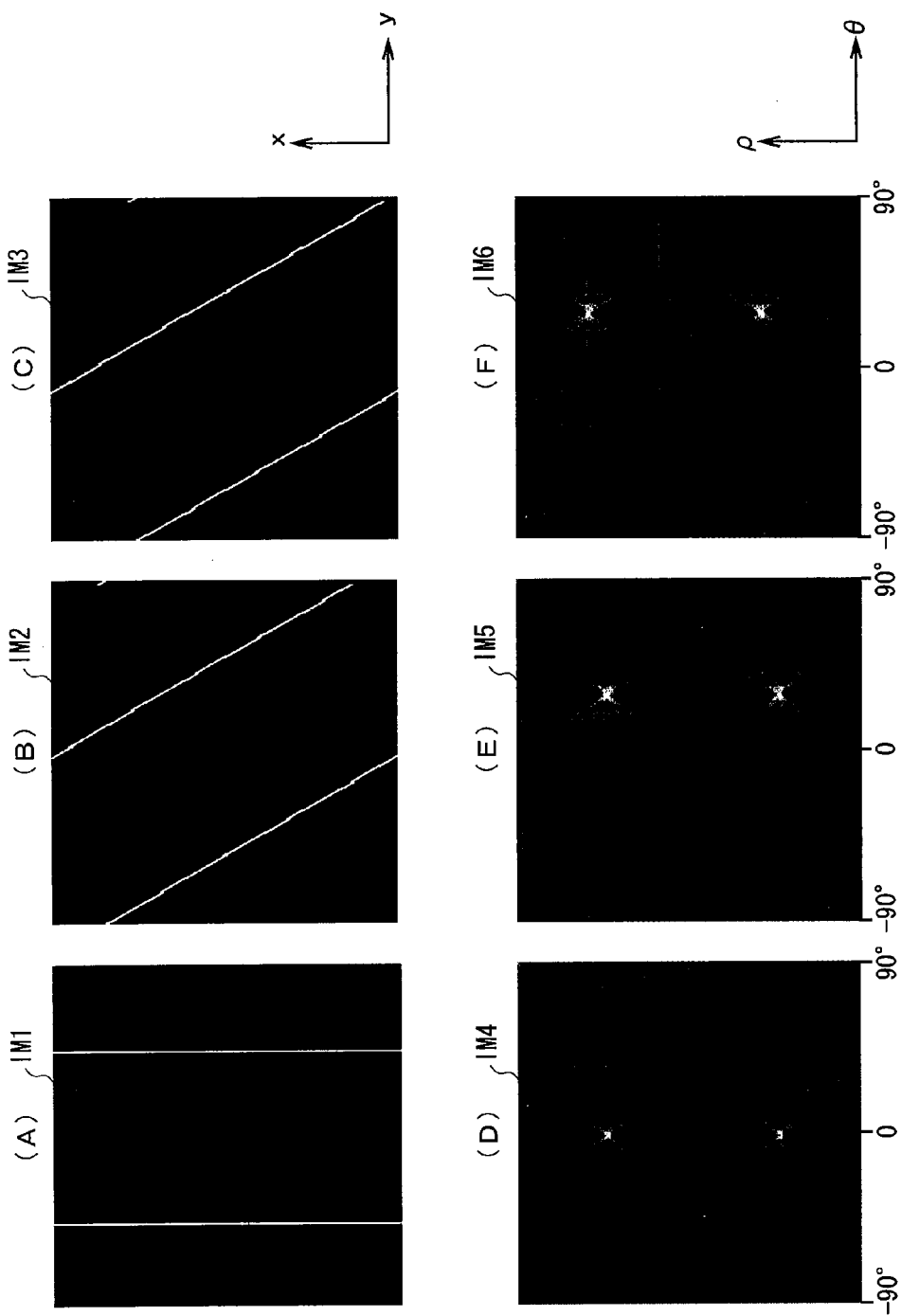
FIG. 7 is a schematic diagram illustrating a sample image and images obtained as a result of the Hough transform.

FIG. 7 illustrates a specific example. FIG. 7 shows an image IM4 (FIG. 7(D)), which is the result of the Hough transform to a sample image IM1 (FIG. 7(A)), an image IM5 (FIG. 7(E)), which is the result of the Hough transform to an image IM2 (FIG. 7(B)), and an image IM6 (FIG. 7(F)), which is the result of the Hough transform to an image IM3 (FIG. 7(C)): the image IM2 is the result of rotating the sample image IM1 through a predetermined angle; the image IM3 is the result of horizontally moving the sample image IM2 a predetermined distance.

It is obvious from FIG. 7 that if the sample image IM1 is rotated on the x-y plane (FIG. 7(B)), the image IM4 moves parallel to a $\theta$ axis on the $\rho$-$\theta$ plane (FIG. 7(E)). Moreover, if the sample image IM2 is horizontally moved on the x-y plane (FIG. 7(C)), the image IM4 moves parallel, to a $\rho$ axis on the $\rho$-$\theta$ plane FIG. 7(F)). Accordingly, the Hough transform makes it possible to detect the amount of parallel and rotational movement of the original image, which is the one on x-y plane before the Hough transform, just by detecting the amount of parallel movement of the image on the $\rho$-$\theta$ plane.

As described above, thanks to its characteristics, the Hough transform can detect the linear component, which is greater than or equal to the predetermined length on the x-y plane, so that the detected result reflects the amount of rotational and parallel movement of the image of the x-y plane.

The Hough transform section 22 transmits the parameter points, which were obtained as a result of the Hough transform process, to the parameter extraction section 23 as data (referred to as parameter data, hereinafter) D22.

Figure 8:
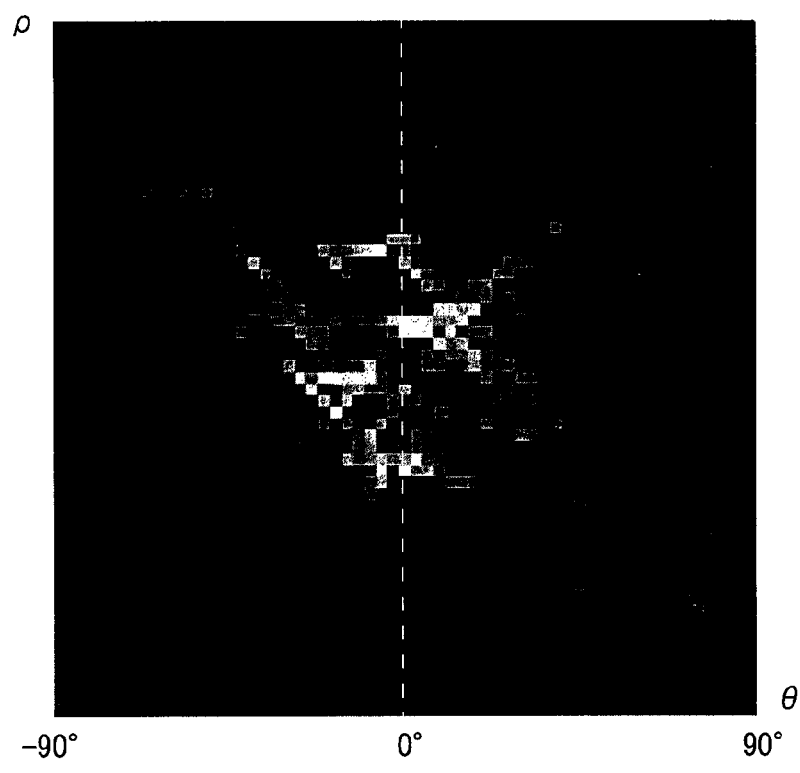
FIG. 8 is a schematic diagram illustrating images obtained as a result of the Hough transform.
Figure 8:
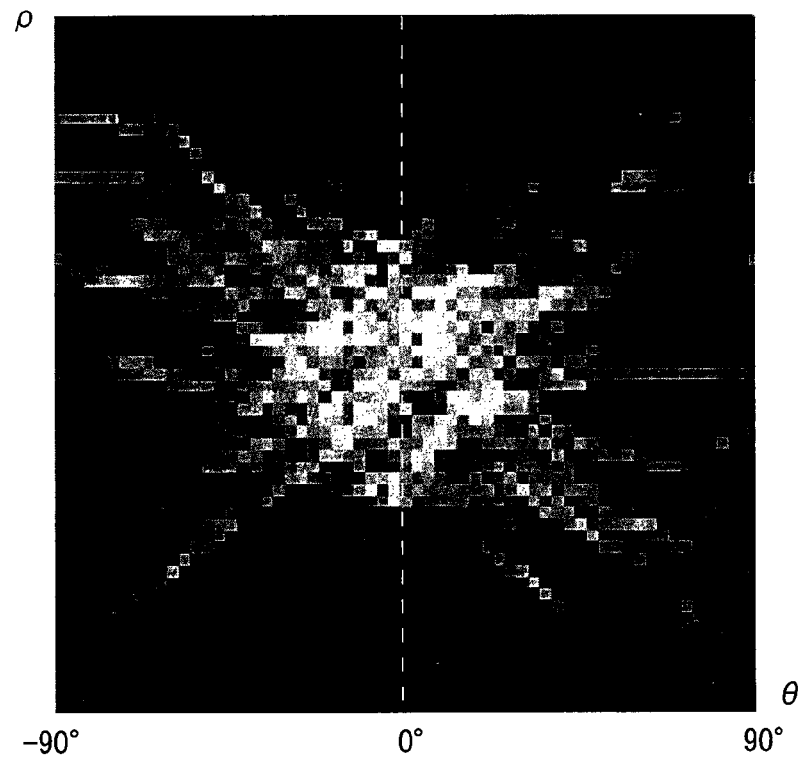

Incidentally, if the image data D21 supplied from the preprocessing section 21 are the data shown in FIGS. 4(A) and (B), the Hough transform section 22 performs the Hough transform process for FIGS. 4(A) and (B) and then transmits the parameter points, obtained as a result of the Hough transform process, to the parameter extraction section 23 as the parameter data D22 shown in FIGS. 8(A) and (B).

Here, the parameter points, shown in FIGS. 8(A) and (B), have been quantified according to the length of the linear component on the image data D21 (FIGS. 4(A) and (B)), which is the one before the Hough transform. More specifically, the quantification of the length is, for example, a process of accumulating values according to the number of curves (FIG. 6) crossing at the parameter point corresponding to the linear component, which is the one before the Hough transform (the accumulated value is referred to as an accumulated value, hereinafter). In this case, each parameter point, shown in FIGS. 8(A) and (B), has been set so that an increase in the accumulated value intensifies the white color.

In this manner, the Hough transform section 22 performs the Hough transform because many of the blood vessels on the image are substantially linear. Therefore, the linear component of the image can be quantified according to its length.

The parameter extraction section 23 receives from the Hough transform section 22 the parameter data D22 representing the parameter points, and extracts from them the parameter point having an accumulated value greater than or equal to a preset extraction threshold. The parameter extraction section 23 then binarizes the extracted parameter point (referred to as a characteristic parameter point, hereinafter), and supplies it to the angle detection section 24 as data (referred to as characteristic parameter data, hereinafter) D23.

Figure 9:
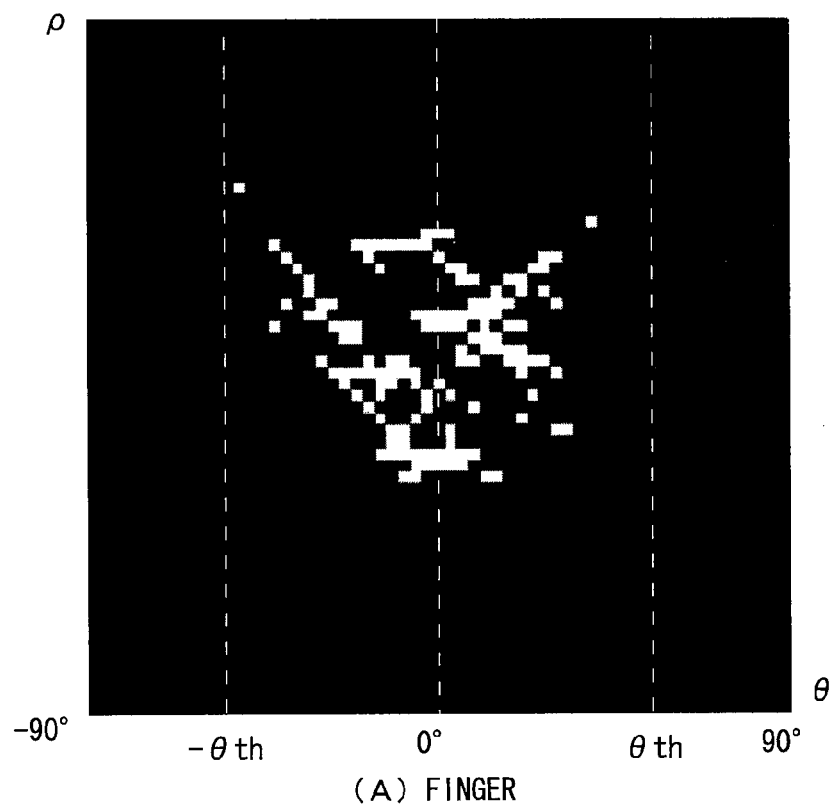
FIG. 9 is a schematic diagram illustrating an image after the extraction of parameters.
Figure 9:
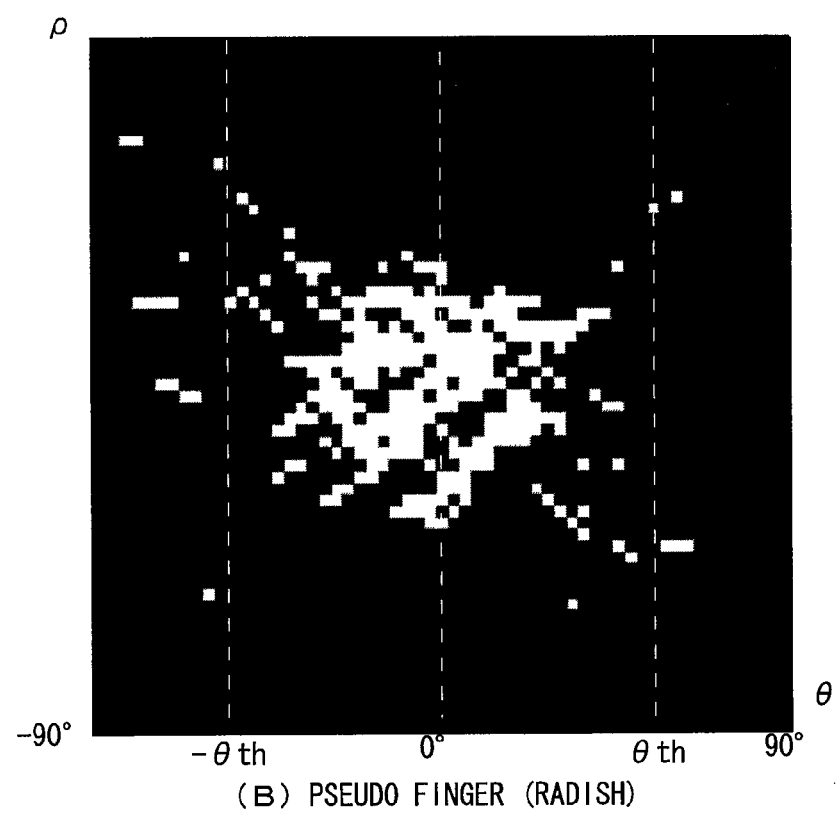

Incidentally, if the parameter data D22 supplied from the Hough transform section 22 are data of the images shown in FIGS. 8(A) and (B), the parameter extraction section 23 extracts the characteristic parameter point from the parameter points shown in FIGS. 8(A) and (B), binarizes it and transmits the resultant image to the angle detection section 24 as the characteristic parameter data D23 as shown in FIGS. 9(A) and (B).

In that manner, the parameter extraction section 23 extracts the characteristic parameter point, which was the linear component whose length is greater than or equal to the predetermined length on the x-y plane before the Hough transform, from among the parameter points representing the linear component, and then binarizes the accumulated value of the extracted characteristic parameter point.

The angle detection section 24 receives from the parameter extraction section 23 the characteristic parameter data D23 representing the characteristic parameter points, and detects from them the characteristic parameter point which is outside a range of from a preset upper limit angle "θth" to a preset lower limit angle "−θth" (referred to as an allowable angle range).

The definition of the allowable angle range is based on the longitudinal length of the finger as a reference direction because many of the blood vessels of the finger, which is part of a living body, are substantially linear along the longitudinal direction (a direction of the circulation of blood) rather than the horizontal direction. Moreover, the allowable angle range has been set so that: if a picture of a pseudo finger, such as a root crop whose inside-root tubes are relatively widespread along its longitudinal and horizontal directions compared with the blood vessels of the finger, is taken, the characteristic parameter points obtained as a result of the Hough transform for the inside-root tubes that are widespread along the finger's horizontal direction (i.e. with a larger angle with respect to the reference direction) are outside the allowable angle range.

Here, if there are a lot of characteristic parameter points outside the allowable angle range from a statistical point of view, this means that the image signals S2 or S20 are those obtained as a result of taking a picture of a pseudo finger. Accordingly, if there are a lot of characteristic parameter points outside the allowable angle range from a statistical point of view, the angle detection section 24 ends the blood vessel registration mode or the authentication mode and performs a notification process using the notification section 15 (FIG. 1) to encourage a user to restart the registration or authentication process. Thus, the angle detection section 24 keeps the device from registering the wrongly recognized pseudo finger as living body identification information or comparing it with the registered living body identification information.

Whereas, if there are only a few of characteristic parameter points outside the allowable angle range from a statistical point of view, this means that the image signals S2 or S20 are those obtained as a result of taking a picture of a living body's finger. Accordingly, if there are only a few of characteristic parameter points outside the allowable angle range from a statistical point of view, the angle detection section 24 continues the blood vessel registration mode or the authentication mode.

This means that if running in the blood vessel registration mode, the angle detection section 24 generates the registrant identification data D1 (FIG. 2) for registration by associating the characteristic parameter points extracted from the result of the Hough transform with the image data D21. Whereas, if running in the authentication mode, the angle detection section 24 generates data (referred to as comparison target characteristic data, hereinafter) Dx (FIG. 2) to be compared with the registrant identification data D1, by associating the characteristic parameter points extracted from the result of the Hough transform with the image data D21: the data Dx represent the characteristic of the verification-target user's blood vessels.

In this manner, using the extracted characteristic parameter points, the angle detection section 24 can make a determination as to whether the image of the image signals S2 or S20 is the one obtained as a result of taking a picture of a living body's finger or a pseudo finger according to the amount of characteristic parameter points outside the allowable angle range from a statistical point of view. If the image of the image signals S2 or S20 is the one obtained as a result of taking a picture of a living body's finger, the angle detection section 24 associates the obtained characteristic parameter points with the image data D21 for registration or comparison. On the other hand, if the image of the image signals S2 or S20 is the one obtained as a result of taking a picture of a pseudo finger, the angle detection section 24 excludes the obtained characteristic parameter points from those to be registered or compared.

In this manner, the control section 10 is designed to perform the image process in blood vessel registration mode or authentication mode.

(1-5) A Procedure of a First Registration Process

Figure 10:
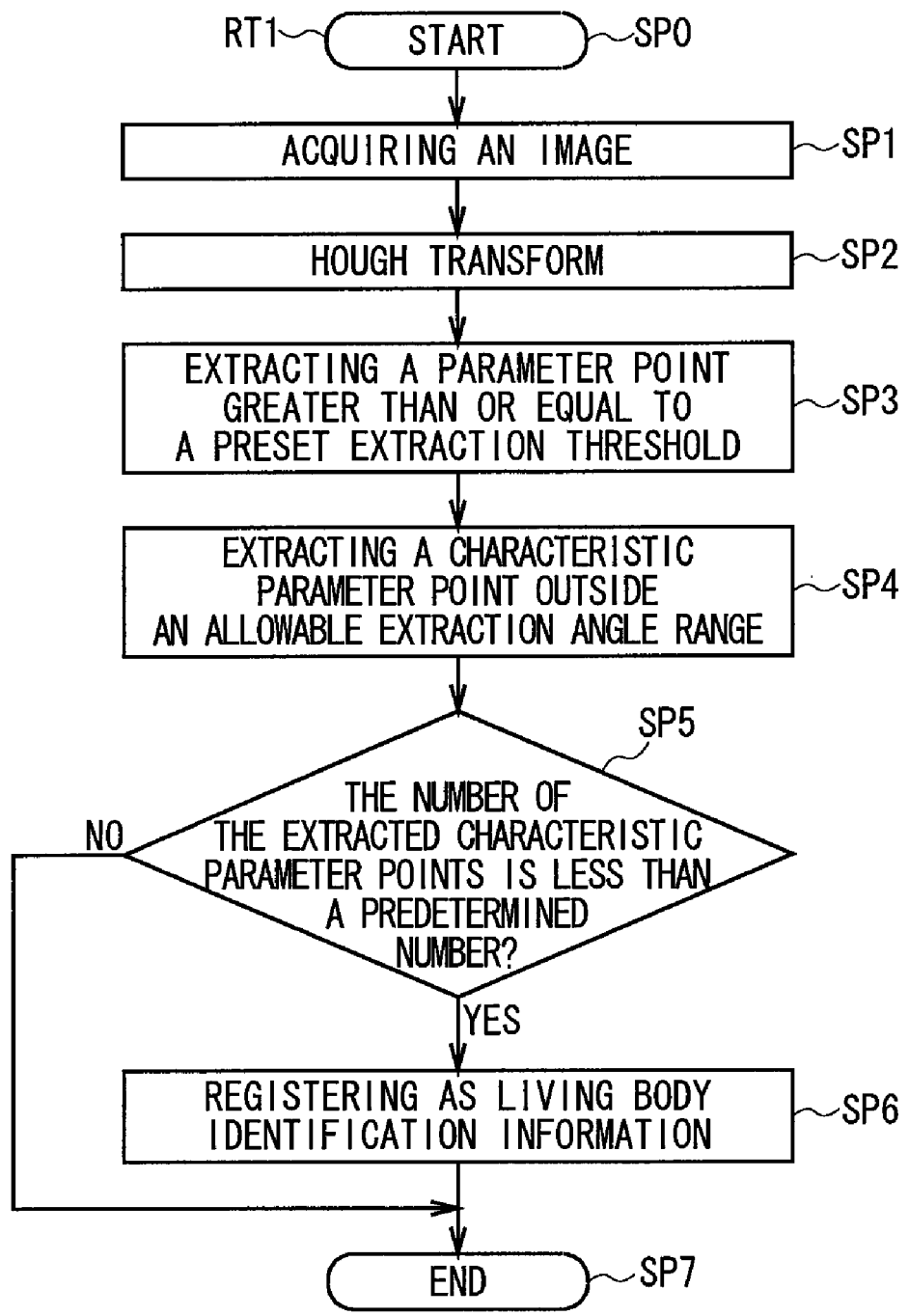
FIG. 10 is a flowchart illustrating a procedure of a first registration process.

The control section 10 runs in blood vessel registration mode or authentication mode. The following describes a procedure of a first registration mode for the blood registration mode, with reference to a flowchart of FIG. 10.

Here, when receiving the execution command COM1 from the operation section 11 (FIG. 1), the control section 10 at step SP0 starts the procedure RT1 of the first registration process, and at a subsequent step SP1 controls the blood vessel image-capturing section 12 through the drive control section 12a (FIG. 1). The control section 10 then preprocesses the image signal S2, which was generated by the blood vessel image-capturing section 12 that took a picture, to obtain the binarized image data D21 (FIG. 2).

Then, the control section 10 at step SP2 performs the Hough transform process for the image data D21. At a subsequent step SP3, the control section 10 extracts from those obtained as a result of the Hough transform process the parameter points that are greater than or equal to the preset extraction threshold, regards them as the characteristic parameter points, binarizes them, and proceeds to a next step SP4.

The control section 10 at step SP4 detects from the extracted characteristic parameter points those outside the allowable angle range. At a subsequent step SP5, the control section 10 makes a determination as to whether there are only a few of the characteristic parameter points detected (i.e. whether the number of the characteristic parameter points is less than a predetermined number with respect to the total number of characteristic parameter points).

If the number of the characteristic parameters detected is less than the predetermined number, the control section 10 at step SP5 assumes that this is the image (the image signals S2) obtained as a result of taking a picture of a living body's finger, and, at a subsequent step SP6, associates the characteristic parameter points with the image data D21 to store them in the flash memory 13 (FIG. 1) as the registrant identification data D1 (FIG. 2), thereby registering them in the flash memory 13. After that, the control section 10 proceeds to step SP7 to end the procedure RT1 of the first registration process. Incidentally, if running in the authentication mode, the control section 10 at step SP6 associates the characteristic parameter points with the image data D21 and regards them as the comparison target characteristic data Dx. The control section 10 then reads out from the flash memory 13 the registered registrant identification data D1, and compares the registrant identification data D1 with the comparison target characteristic data Dx.

On the other hand, if the number of the characteristic parameter points detected is greater than or equal to the predetermined number, the control section 10 at step SP5 decides that this is the image (the image signals S2) obtained as a result of taking a picture of a pseudo finger, and then proceeds to step SP7 to end the procedure RT1 of the first registration process.

By following this procedure RT1 of the first registration process, the control section 10 can run in blood vessel registration mode.

(1-6) An Operation and Effect of the First Embodiment

With the configuration described above, the authentication device 1 preprocesses the image signals S2 or S20 (FIG. 2) obtained as a result of taking a picture of the blood vessels of the finger in a predetermined manner, and performs the Hough transform process after extracting the outline. Then, the authentication device 1 sets a certain extraction condition, and extracts the characteristic parameter points from the parameter points obtained as a result of the Hough transform process.

Then, if there are only a few of characteristic parameter points outside the allowable angle range from a statistical point of view, the authentication device 1 assumes that the characteristic parameter points are those to be registered or to be compared with the registered one. On the other hand, if there are a lot of characteristic parameter points outside the allowable angle range from a statistical point of view, the authentication device 1 excludes the characteristic parameter points from those to be registered or to be compared with the registered one.

Accordingly, if it takes a picture of a finger, which is part of a living body, and is given components of the finger's blood vessels as components of the image signals S2 or S20, the authentication device 1 assumes that the resultant characteristic parameter points come from the result of taking a picture of a finger, which is part of a living body. The authentication device 1 therefore assumes that the characteristic parameter points are those to be registered or to be compared with the registered one.

On the other hand, if it takes a picture of a pseudo finger, such as radish and other root crops, and is given components of the root crop's inside-root tubes as the components of the image signals S2 or S20, the authentication device 1 assumes that the resultant characteristic parameter points come from the result of taking a picture of the pseudo finger. The authentication device 1 therefore excludes the characteristic parameter points from those to be registered or to be compared with the registered one. In this manner, according to the number of the characteristic parameter points outside the predetermined allowable angle range from a statistical point of view, the authentication device 1 makes a determination as to whether the image of the image signals S2 or S20 is the one obtained as a result of taking a picture of a finger, which is part of a living body, or a pseudo finger. Thus, this prevents the authentication device 1 from registering the characteristic parameter points obtained as a result of taking a picture of a pseudo finger as the living body identification information or comparing them with the registration information that has been previously registered as the living body identification information.

Moreover, as for this authentication device 1, not only do the characteristic parameter points, obtained as a result of the extraction from the result of the Hough transform, play a part in determining what the content of the image of the image signals S2 or S20 is, but they also constitute the living body identification information to be registered. Accordingly, the authentication device 1 can use the same components to perform the determination of the image's content and the generation of the living body identification information, thereby simplifying its structure.

According to the above configuration, the device makes a determination as to whether the image of the image signals S2 or S20 is the one obtained as a result of taking a picture of a finger, which is part of a living body, or a pseudo finger according to the number of the characteristic parameter points outside the predetermined allowable angle range from a statistical point of view; if it is the one obtained as a result of taking a picture of the pseudo finger, the device excludes the resultant characteristic parameter points from those to be registered or to be compared with the registered one. Therefore, this keeps the device from registering the characteristic parameter points obtained as a result of taking a picture of the pseudo finger as the living body identification information or comparing them with the registration information that have been previously registered as the living body identification information. Thus, the authentication device 1 improves the accuracy of authentication.

Figure 11:
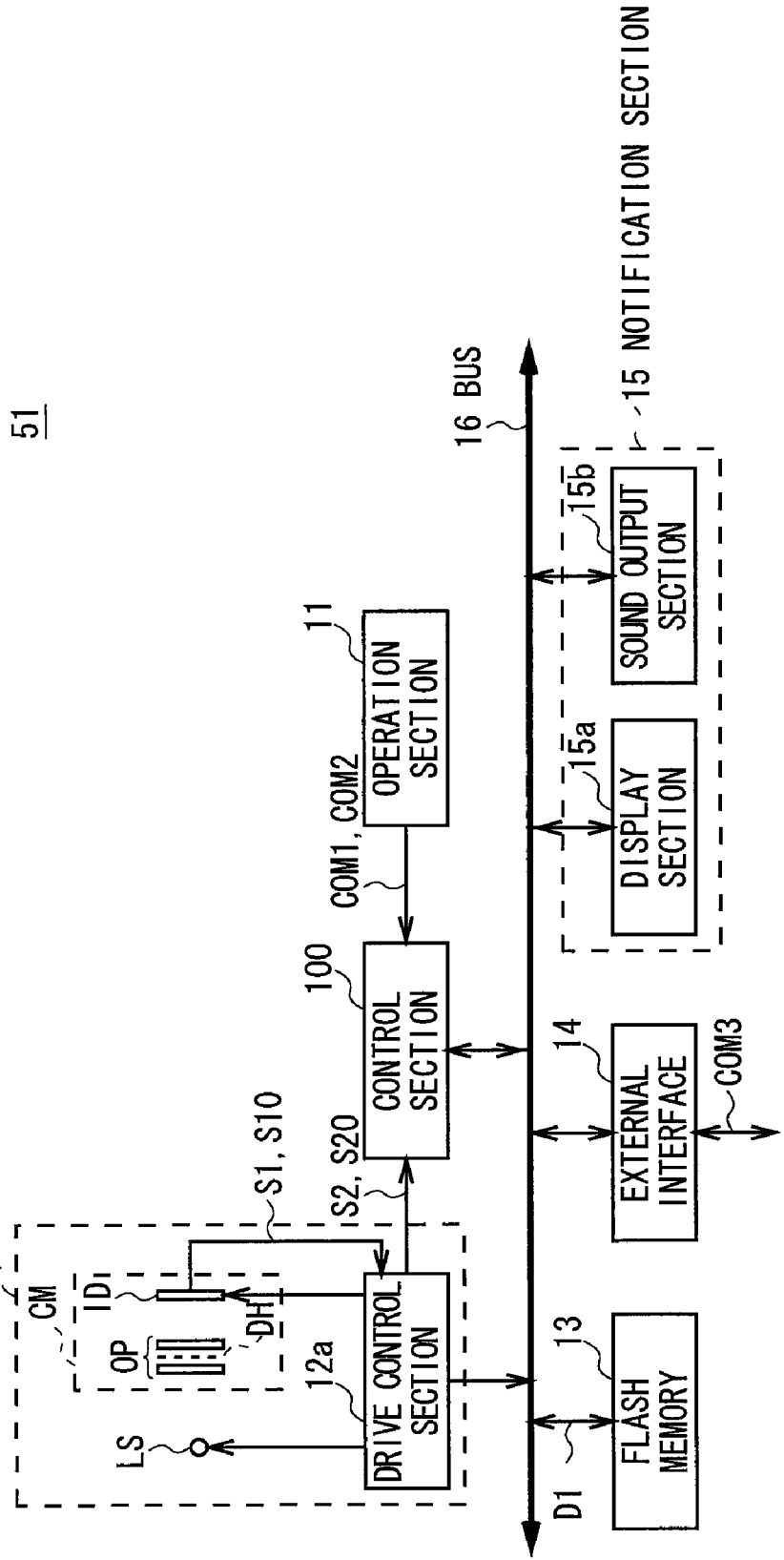
FIG. 11 is a block diagram illustrating the overall configuration of an authentication device according to a first embodiment of the present invention.
Figure 12:
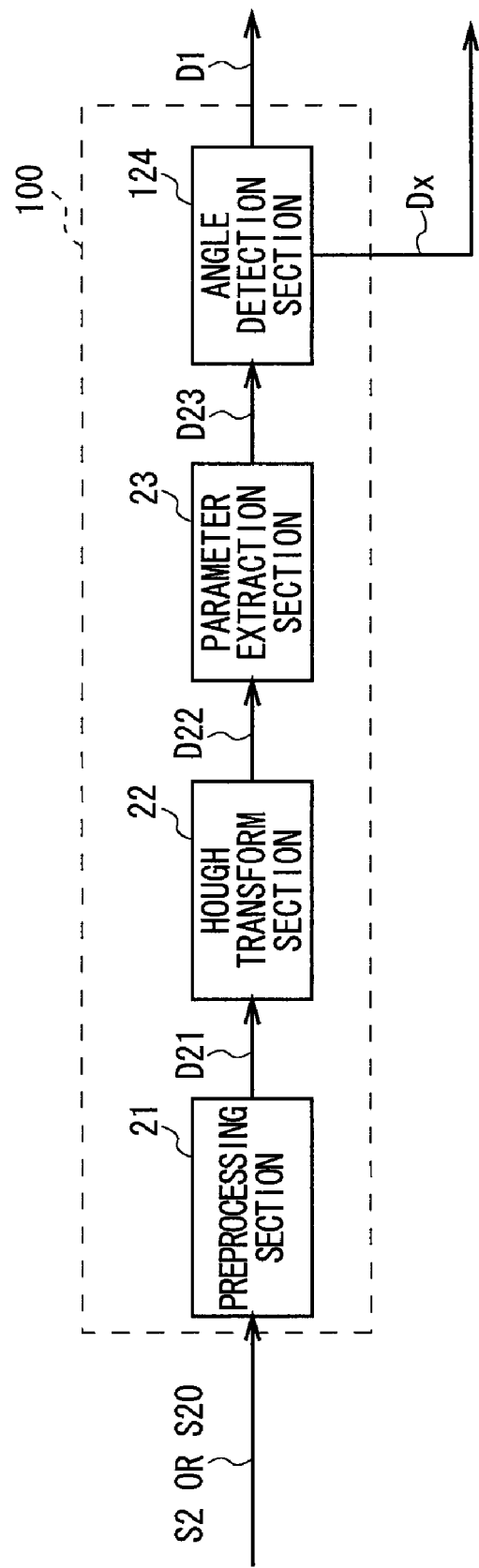
FIG. 12 is a functional block diagram illustrating the content of an image process by a control section according to a first embodiment of the present invention.

(2) Second Embodiment (2-1) The Overall Configuration of an Authentication Device According to a Second Embodiment FIG. 11, whose parts have been designated by the same symbols as the corresponding parts of FIG. 1, shows an authentication device 51 according to a second embodiment of the present invention. The authentication device 51 has the same configuration as the above-noted authentication device 1 of the first embodiment except the configuration of a control section 100. FIG. 12, whose parts have been designated by the same symbols as the corresponding parts of FIG. 2, shows the configuration of the control section 100. Except the configuration of an angle detection section 124, the control section 100 has the same configuration as the above-noted authentication device 10 of the first embodiment.

An image process of the second embodiment is different from that of the first embodiment in which the device distinguishes a finger, which is part of a living body, from a pseudo finger according to the number of characteristic parameter points outside the allowable angle range from a statistical point of view: the image process of the second embodiment makes a determination as to whether a finger was inclined during a process of taking its picture according to the bias of the distribution of the extracted characteristic parameter point's angle with respect to the reference angle.

(2-2) The Detailed Description of the Image Process

After the parameter extraction section 23 extracts the characteristic parameter point, the angle detection section 124 of the control section 100 counts the number of characteristic parameter points inside a first angle range (from "$-\theta$th" to "0 degree," in this case) and a second angle range (from "0 degree" to "$\theta$th," in this case) (FIG. 9): the first and second angle ranges were for example generated as a result of equally dividing the allowable angle range.

Then, the angle detection section 124 regards the number of characteristic parameter points inside the first angle range as PA, the number of characteristic parameter points inside the second angle range as PB, divides the one by the other to obtain the ratio of PA/PB (or PB/PA), and makes a determination as to whether it is inside a predetermined allowable ratio range whose center is 1.

The allowable ratio range, for example, is defined according to the fact that if the longitudinal direction of a finger put on the authentication device 1 is aligned with a reference direction, the distribution of the angles of the blood vessels of the finger evenly spread along the reference direction: the reference direction is a front direction of a user standing in front of the authentication device 1. Moreover, the allowable ratio range is set so that if the finger is inclined with respect to the reference direction during a process of taking its picture, it allows the device to detect the bias of the distribution of the resultant characteristic parameter points with respect to the reference direction.

Here, if the ratio PA/PB (or PB/PA) is outside the allowable ratio range, this means that the image of the image signals S2 or S20 is a picture taken when the finger was inclined with respect to the reference direction. Accordingly, when the ratio PA/PB (or PB/PA) is outside the allowable ratio range, the angle detection section 124 stops the blood vessel registration mode or the authentication mode, and notifies a user of the fact that the finger was inclined through the notification section 15 (FIG. 11). Thus, this prevents the angle detection section 124 from registering the finger, whose picture was taken when it was inclined, as the living body identification information or comparing it with the registration information that have been previously registered as the living body identification information.

Whereas, if the ratio PA/PB (or PB/PA) is within the allowable ratio range, this means that the image of the image signals S2 or S20 is a picture taken when the finger was aligned with the correct direction (i.e. the reference direction). Therefore, when the ratio PA/PB (or PB/PA) is within the allowable ratio range, the angle detection section 124 continues the blood vessel registration mode or the authentication mode.

This means that if running in the blood vessel registration mode, the angle detection section 124 generates the registrant identification data D1 (FIG. 12) for registration by associating the characteristic parameter points extracted from the result of the Hough transform with the image data D21. Whereas, if running in the authentication mode, the angle detection section 124 generates the comparison target characteristic data Dx (FIG. 12) to be compared with the registrant identification data D1, by associating the characteristic parameter points extracted from the result of the Hough transform with the image data D21.

In this manner, based on the bias of the distribution of the angles of the extracted characteristic parameter point with respect to the reference direction, the angle detection section 124 makes a determination as to whether the image of the image signals S2 or S20 is a picture taken when the finger was pointed in the correct direction with respect to the reference direction. If the image of the image signals S2 or S20 is a picture taken when the finger was pointed in the correct direction, the angle detection section 124 associates the obtained characteristic parameter points with the image data D21 for registration or comparison. On the other hand, if the image of the image signals S2 or S20 is a picture taken when the finger was inclined, the angle detection section 124 excludes the obtained characteristic parameter points from those to be registered or compared.

In this manner, the control section 100 is designed to perform the image process in blood vessel registration mode or authentication mode.

(2-3) A Procedure of a Second Registration Process

Figure 13:
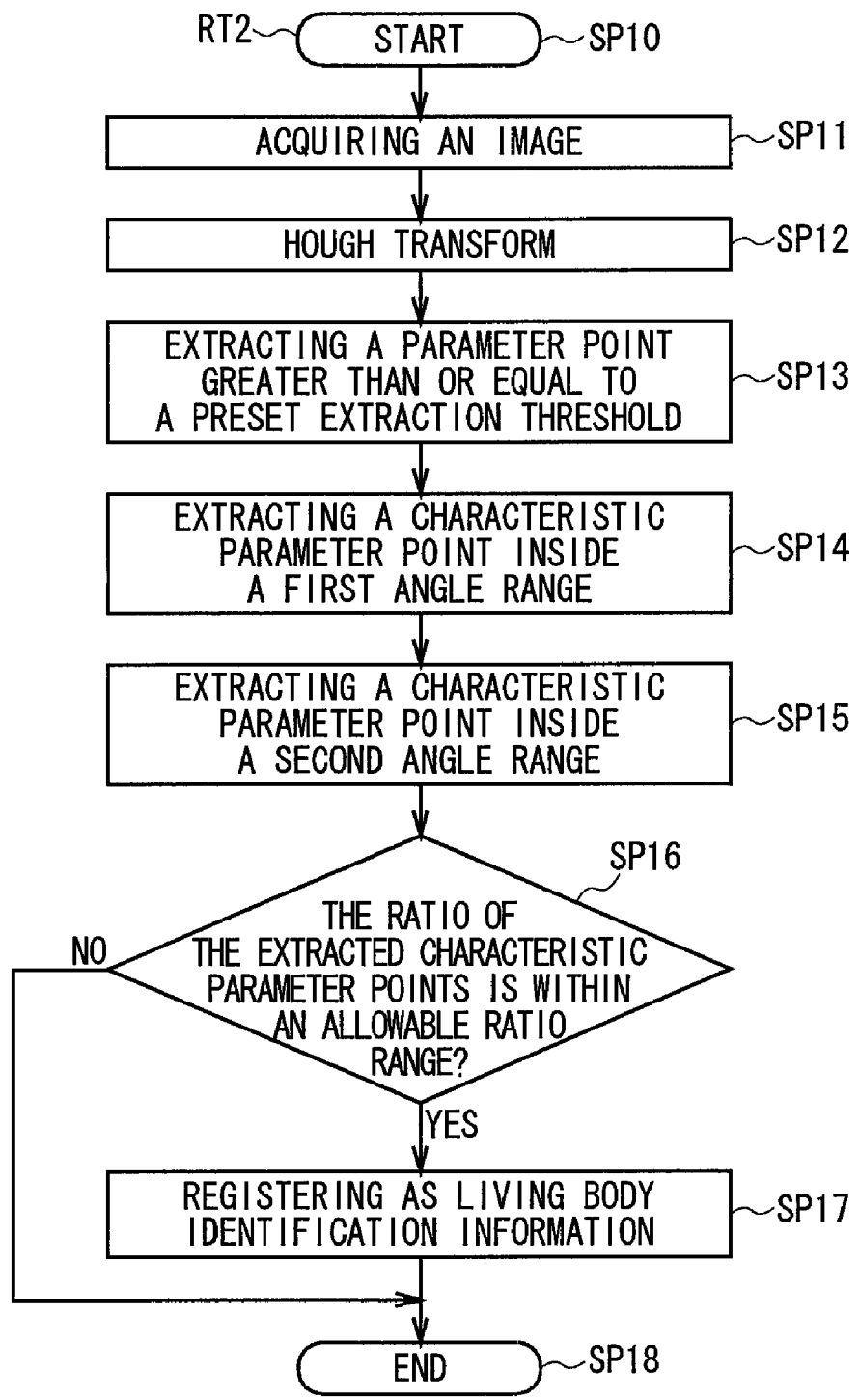
FIG. 13 is a flowchart illustrating a procedure of a second registration process.

The control section 100 runs in blood vessel-registration mode or authentication mode. The following describes a procedure of a second registration mode for the blood vessel registration mode, with reference to a flowchart of FIG. 13.

Here, when receiving the execution command COM1 from the operation section 11 (FIG. 11), the control section 100 at step SP10 starts the procedure RT2 of the second registration process, and at a subsequent step SP11 controls the blood vessel image-capturing section 12 through the drive control section 12a (FIG. 11). The control section 100 then preprocesses the image signal S2, which was generated by the blood vessel image-capturing section 12 that took a picture, to obtain the binarized image data D21 (FIG. 12).

Then, the control section 100 at step SP12 performs the Hough transform process for the image data D21. At a subsequent step SP13, the control section 100 extracts from those obtained as a result of the Hough transform process the parameter points that are greater than or equal to the preset extraction threshold, regards them as the characteristic parameter points, and proceeds to a next step SP14.

The control section 100 at step SP14 counts the number of the extracted parameter points inside the first angle range. At a subsequent step SP15, the control section 100 counts the number of the extracted parameter points inside the second angle range. At a subsequent step SP16, the control section 100 makes a determination as to whether the ratio of the characteristic parameter points is inside the allowable ratio range.

If the ratio of the characteristic parameter points is inside the allowable ratio range, the control section 100 assumes that it took a picture of the finger pointed in the correct direction, and, at a subsequent step SP17, associates the characteristic parameter points with the image data D21 to register them as the registrant identification data D1 (FIG. 12). After that, the control section 100 proceeds to step SP18 to end the procedure RT2 of the second registration-process. Incidentally, if running in the authentication mode, the control section 100 at step SP17 associates the characteristic parameter points with the image data D21 and regards-them as the comparison target characteristic data Dx. The control section 100 then reads out from the flash memory 13 (FIG. 11) the registered registrant identification data D1, and compares the registrant identification data D1 with the comparison target characteristic data Dx.

On the other hand, if the ratio of the characteristic parameter points is outside the allowable ratio range, the control section 100 assumes that it took a picture of the finger inclined with respect to the reference direction, and proceeds to step SP18 to end the procedure RT2 of the second registration process.

Thanks to this procedure RT2 of the second registration process, the control section 100 can execute blood vessel registration mode.

(2-4) An Operation and Effect of the Second Embodiment

With the configuration described above, the authentication device 51 excludes, when the distribution of the extracted characteristic parameter points is biased with respect to the reference direction, these characteristic parameter points from those to be registered or compared with the registered one.

Accordingly, if it takes a picture of the finger pointed in the correct direction with respect to the reference direction and is given components of the finger's blood vessels as components of the image signals S2 or S20, the authentication device 51 assumes that the resultant characteristic parameter points come from the result of taking a picture of the finger pointed in the correct direction. The authentication device 51 therefore assumes that the characteristic parameter points are those to be registered or to be compared with the registered one.

On the other hand, if it takes a picture of the finger inclined with respect to the reference direction and is given components of the inclined finger's blood vessels as the components of the image signals S2 or S20, the authentication device 51 assumes that the resultant characteristic parameter points come from the result of taking a picture of the inclined finger. The authentication device 51 therefore excludes the characteristic parameter points from those to be registered or to be compared with the registered one. In this manner, according to whether the distribution of the components of the angles of the characteristic parameters is biased with respect to the reference direction, the authentication device 51 makes a determination as to whether the image of the image signals S2 or S20 is a picture taken when the finger was pointed in the correct direction with respect to the reference direction. Thus, this prevents the authentication device 51 from registering the characteristic parameter points obtained as a result of taking a picture of the inclined finger as the living body identification information or comparing them with the registration information that has been previously registered as the living body identification information.

Moreover, as for this authentication device 51, not only do the characteristic parameter points, obtained as a result of the extraction from the result of the Hough transform, play a part in determining what the content of the image of the image signals S2 or S20 is, but they also constitute the living body identification information to be registered. Accordingly, the authentication device 51 can use the same components to perform the determination of the image's content and the generation of the living body identification information, thereby simplifying its structure.

According to the above configuration, the device makes a determination as to whether the image of the image signals S2 or S20 is a picture taken when the finger was pointed in the correct direction with respect to the reference direction according to the bias of the distribution of the angles of the extracted characteristic parameter points with respect to the reference direction; if it is a picture of the finger inclined with respect to the reference direction, the device excludes the extracted characteristic parameter points from those to be registered or to be compared with the registered one. Therefore, this keeps the device from registering the characteristic parameter points obtained as a result of taking a picture of the inclined finger as the living body identification information or comparing them with the registration information that have been previously registered as the living body identification information. Thus, the authentication device 51 improves the accuracy of authentication.

(3) Other Embodiments

In the above-noted first and second embodiments, a finger is applied as part of a living body. However, the present invention is not limited to this. For example, a palm, a toe, an arm, an eye, an arm or the like may be applied.

Moreover, in the above-noted first and second embodiments, the blood vessels are applied as a target for biometrics authentication. However, the present invention is not limited to this. For example, fingerprints, mouth prints, an iris, a nerve or the like may be applied. Incidentally, when a nerve is applied, a marker peculiar to the nerve is injected into a body; taking a picture of the marker allows the nerve to serve as the biometrics authentication target as in the above-noted embodiments.

Furthermore, in the above-noted first and second embodiments, as an outline extraction means to extract an outline of an object of a biometrics authentication target from the image signals, a series of processes, including the A/D conversion process, the outline extraction process, the smoothing process, the binarization process and the thinning process, is sequentially performed. However, the present invention is not limited to this. Some of them may be omitted or replaced with other processes, or a new process may be added to them. Incidentally, the order of the processes can be changed when necessary.

Furthermore, in the above-noted first and second embodiments, the authentication devices 1 and 51 including the photo capturing function, the verification function and the registration function are applied. However, the present invention is not limited to this. The configuration may vary according to how they will be used. For example, each function may be applied to a different device.

Furthermore, in the above-noted first and second embodiments, the devices associate the characteristic parameter points with the image data D21 to generate the registrant identification data D1 and the comparison target characteristic data Dx. However, the present invention is not limited to this. Finally, the registrant identification data D1 and the comparison target characteristic data Dx may be: the characteristic parameter points, the image data D21, the parameter data D22 or the characteristic parameter data D23, or the combination of them (i.e. associating them).

Furthermore, in the above-noted first embodiment, the root crops, such as radish, are applied as a pseudo finger. However, the present invention is not limited to this. Such pseudo fingers as gummi candy, a print of a blood-vessel image or a dummy of a human finger may be applied as long as they can offer image data resembling the blood vessel patterns of a living body, and can offer the same effect as the above-noted embodiment does.

Furthermore, in the above-noted first embodiment, if there are a lot of characteristic parameter points outside the predetermined angle range from a statistical point of view, the device excludes these characteristic parameter points from those to be registered or to be compared with the registered one. However, the present invention is not limited to this. If the number of characteristic parameter points outside the predetermined allowable angle range is greater than or equal to a predetermined number, or if the ratio of characteristic parameter points outside the predetermined allowable angle range to those inside it is greater than or equal to a predetermined level, the device may exclude these characteristic parameter points from those to be registered or to be compared with the registered one. Moreover, depending on how the allowable angle range and the reference direction have been set, if the number of characteristic parameter points inside the predetermined allowable angle range is greater than or equal to a predetermined number (or if the ratio of the characteristic parameter points is greater than or equal to a predetermined level), the device may exclude these characteristic parameter points from those to be registered or to be compared with the registered one.

Furthermore, in the above-noted second embodiment, the number of characteristic parameter points inside the first angle range is PA while the number of characteristic parameter points inside the second angle range is PB; the device makes a determination as to whether the ratio PA/PB (or PB/PA) regarding the characteristic parameter points, which means dividing the one by the other, is within the predetermined allowable ratio range whose center is 1. However, the present invention is not limited to this. A method of calculating another ratio can be applied as long as it represents the bias of the characteristic parameter points: the device may divide PA or PB by the total number of characteristic parameter points, PP, and make a determination as to whether the ratio PA/PP or PB/PP is within the predetermined allowable ratio range.

Furthermore, in the above-noted second embodiment, if the device takes a picture of the finger inclined with respect to the reference direction and is given the components of the inclined finger's blood vessels as the components of the image signals S2 or S20, the angle detection section 124 assumes that the resultant characteristic parameter points come from the result of taking a picture of the inclined finger, and excludes these characteristic parameter points from those to be registered or to be compared with the registered one. However, the present invention is not limited to this. This method can be also used to detect whether the finger is inclined. Then, if the angle detection section 124 detects the inclination of the finger, the control section 100 corrects the obtained characteristic parameter points so that they evenly spread along the reference direction on the $\rho$-$\theta$ plane. This allows the device to continue the blood vessel registration mode or the authentication mode without forcing the user to perform authentication again. Moreover, adding the function of detecting the finger's inclination to the first embodiment can improve its effect.

Specifically, a detection step of detecting the inclination of the finger by the angle detection section 24 and a correction step that the control section 10 performs when the finger is inclined can be added between step SP3 and SP4 of the procedure (FIG. 10) of the first registration process of the above-noted first embodiment. In this case, at step SP4, the authentication device 1 can keep the characteristic parameters obtained as a result of taking a picture of the user's inclined finger inside the allowable extraction angle range. Thus, the authentication device 1 can improve the accuracy of authentication further.

Industrial Applicability

The present invention can be applied to the field of biometrics authentication.

DESCRIPTION OF SYMBOLS 1, 51 . . . AUTHENTICATION DEVICE, 10, 100 . . . CONTROL SECTION,
11 . . . OPERATION SECTION, 12 . . . BLOOD VESSEL IMAGE-CAPTURING SECTION,
12a . . . DRIVE CONTROL SECTION, 13 . . . FLASH MEMORY, 14 . . . EXTERNAL INTERFACE,
15 . . . NOTIFICATION SECTION, 15a . . . DISPLAY SECTION, 15b . . . SOUND OUTPUT SECTION,
21 . . . PREPROCESSING SECTION, 22 . . . HOUGH TRANSFORM SECTION,
23 . . . PARAMETER EXTRACTION SECTION, 24, 124 . . . ANGLE DETECTION SECTION,
LS . . . NEAR INFRARED BEAM SOURCE, CM . . . IMAGE-CAPTURING CAMERA,
OP . . . OPTICAL SYSTEM, DH . . . APERTURE DIAPHRAGM, ID . . . IMAGE-CAPTURING ELEMENT,
RT1 . . . PROCEDURE OF FIRST REGISTRATION PROCESS,
RT2 . . . PROCEDURE OF SECOND REGISTRATION PROCESS

The invention claimed is:

1. A registration device comprising:
   outline extraction means for performing a predetermined process for an input image signal and extracting an outline of an object included in the image signal;
   Hough transform means for performing the Hough transform for image data obtained as a result of extracting the outline; and
   registration means for registering the result of the Hough transform as living body identification information if an angle component that is part of a parameter obtained as a result of the Hough transform by the Hough transform means and that represents an angle of the outline with respect to a reference direction is within an angle range defined as a living body's part having linearity.

2. The registration device according to claim 1, wherein the registration means registers the result of the Hough transform as the living body identification information if the angle component of the parameter obtained as a result of the Hough transform by the Hough transform means is within an angle range of from a first threshold set as a predetermined upper limit angle to a second threshold set as a predetermined lower limit angle.

3. The registration device according to claim 1, wherein the registration means registers the result of the Hough transform as the living body identification information if the distribution of the angle components of the parameter obtained as a result of the Hough transform by the Hough transform means evenly spreads along the reference direction.

4. The registration device according to claim 1, comprising correction means for correcting, when the distribution of the angle components of the parameter obtained as a result of the Hough transform by the Hough transform means is biased with respect to the reference direction, the result of the Hough transform so that the distribution of the angle components of the parameter evenly spread along the reference direction, wherein the registration means registers the corrected result of the Hough transform as living body identification information if an angle component that is part of the parameter obtained as a result of the Hough transform and the correction by the correction means and that represents an angle of the outline with respect to the reference direction is within the angle range defined as a living body's part having linearity.

5. A verification device comprising:
   outline extraction means for performing a predetermined process for an input image signal and extracting an outline of an object included in the image signal;
   Hough transform means for performing the Hough transform for image data obtained as a result of extracting the outline; and
   verification means for comparing the result of the Hough transform with previously-registered living body identification information if an angle component that is part of a parameter obtained as a result of the Hough transform by the Hough transform means and that represents an angle of the outline with respect to a reference direction is within an angle range defined as a living body's part having linearity.

6. The verification device according to claim 5, wherein the verification means compares the result of the Hough transform with the previously-registered living body identification information if the angle component of the parameter obtained as a result of the Hough transform by the Hough transform means is within an angle range of from a first threshold set as a predetermined upper limit angle to a second threshold set as a predetermined lower limit angle.

7. The verification device according to claim 5, wherein the verification means compares the result of the Hough transform with the previously-registered living body identification information if the distribution of the angle components of the parameter obtained as a result of the Hough transform by the Hough transform means evenly spreads along the reference direction.

8. The verification device according to claim 5, comprising correction means for correcting, when the distribution of the angle components of the parameter obtained as a result of the Hough transform by the Hough transform means is biased with respect to the reference direction, the result of the Hough transform so that the distribution of the angle components of the parameter evenly spread along the reference direction, wherein the verification means compares the corrected-result of the Hough transform with the previously-registered living body identification information if an angle component that is part of the parameter obtained as a result of the Hough transform and the correction by the correction means and that represents an angle of the outline with respect to the reference direction is within the angle range defined as a living body's part having linearity.

9. An authentication method comprising:
providing a processing device configured to execute the steps of:
performing a predetermined process for an input image signal and extracting an outline of an object included in the image signal;
performing the Hough transform for image data obtained as a result of extracting the outline; and
registering the result of the Hough transform as living body identification information or comparing the result of the Hough transform with the previously-registered living body identification information if an angle component that is part of a parameter obtained as a result of the Hough transform by the Hough transform means and that represents an angle of the outline with respect to a reference direction is within an angle range defined as a living body's part having linearity.

10. An authentication program stored in a non-transitory computer readable medium, the program causing a computer to execute steps of:
performing a predetermined process for an input image signal and extracting an outline of an object included in the image signal;
performing the Hough transform for image data obtained as a result of extracting the outline; and
registering the result of the Hough transform as living body identification information or comparing the result of the Hough transform with the previously-registered living body identification information if an angle component that is part of a parameter obtained as a result of the Hough transform by the Hough transform means and that represents an angle of the outline with respect to a reference direction is within an angle range defined as a living body's part having linearity.

* * * * *